United States Patent Office
2,997,505
Patented Aug. 22, 1961

2,997,505
FLUORO-NITRO OLEFINS
Earl T. McBee, West Lafayette, and Donald J. Cook, Greencastle, Ind., and Ogden R. Pierce, Midland, Mich., assignors, by mesne assignments, to Research Corporation, New York, N.Y., a corporation of New York
No Drawing. Filed July 12, 1954, Ser. No. 442,923
6 Claims. (Cl. 260—644)

This invention relates to a group of novel organic compounds designated as fluoro-nitro olefins and is more particularly concerned with mononitro olefins wherein the fluorine is present as a lower-perfluoroalkyl radical.

The novel compounds of the present invention may be illustrated by the following formula:

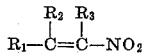

Among the lower-perfluoroalkyl radicals represented by $R_1$ are those having from 1 to about 8 carbon atoms. Among the atoms and radicals represented by $R_2$ and $R_3$ are hydrogen and lower alkyl groups having from 1 to about 8 carbon atoms.

The novel compounds of the present invention may be described as a 1-lower-perfluoroalkyl-2-nitro-1-alkene.

The compounds in general are yellow liquids boiling at about 90 to about 200° C. These compounds have a lachrymatory physiological effect with the intensity of the odor decreasing as the chain length increases. They are also useful as chemical intermediates for making such compounds as fluoro-nitro alkanes, fluoro-di-nitro alkanes and fluoro-amino alkanes.

The compounds of the present invention can be prepared by dehydration of the corresponding fluoro-nitro alcohol. The dehydration has been found to proceed with a number of dehydrating agents, among which are acetic anhydride, propionic anhydride, benzoic anhydride and phosphorus pentoxide. Dehydration with phosphorus pentoxide (Example 1) was found useful for the conversion of only 3,3,4,4,5,5,5-heptafluoro-1-nitro-2-pentanol to the olefin while the other dehydrating agents (as illustrated by acetic anhydride in Example 2) were found to be a more general method operable for all the nitro alcohols. The mechanism of this general method is thought to include the formation of the ester which is then decomposed to form the olefin. In the general method the ester intermediate (the acetoxy in Example 2) was not isolated but was treated immediately with sodium carbonate to form the fluoro-nitro olefin.

While the fluoro-nitro alcohol and the dehydrating agent may be used in approximately equimolar amounts, better yields have been obtained using an excess of the dehydrating agent. The stirred reaction mixture should be heated moderately at reflux temperatures or below for 2-6 hours (depending on the dehydrating agent used). The reaction mixture is then cooled and the excess of dehydrating agent destroyed by hydrolysis with water. The olefin is extracted from the water with ether and dried over a dessicant. The olefin is then obtained by distillation. Further purification may be obtained by rectification using a Podbielniak miniature Hyper-Cal assembly.

The following examples indicate methods by which members of the new group of compounds may be prepared, but are in no way to be construed as limiting the invention thereto.

The fluoro-nitro monohydroxy alcohols from which the fluoro-nitro olefins of the present invention are obtained by dehydration, may be obtained by the condensation of hydrated fluorinated aldehydes and ketones with various nitroalkanes. The fluorinated aldehydes are obtained by reduction of the corresponding fluorinated acids, and are then converted to the hydrated form by the addition of water. The fluorinated ketones are obtained from the fluorinated acids via the acetoacetic ester following the customary procedures for the synthesis of ketones from acetoacetic esters.

PREPARATION 1.—HEPTAFLUOROBUTANAL HYDRATE

Perfluorobutyric acid was converted to heptafluorobutyral by reduction with lithium aluminum hydride. The heptafluorobutyral was hydrated by adding the calculated amount of water to the ice-cooled aldehyde contained in the flask equipped with a stirrer and a Dry Ice-cooled reflux condenser. The conversion of the anhydrous aldehyde to the hydrate was quantitative. The hydrated aldehyde solidified as a white solid melting at 57–58° C.

PREPARATION 2.—FLUORAL HYDRATE

Using trifluoroacetic acid and following the procedure of Preparation 1, fluoral was obtained and converted to the hydrated form by addition of a little less than the calculated amount of water while cooling in a Dry Ice-carbon tetrachloride, chloroform bath.

PREPARATION 3.—3,3,4,4,5,5,5-HEPTAFLUORO-2-PENTANONE

Ethyl heptafluorobutyrate was obtained by esterification of heptafluorobutyric acid. Two hundred forty-two grams of ethyl heptafluorobutyrate (1 mole) was condensed with 44 grams of ethyl acetate (0.5 mole) in the presence of 2.0 grams of sodium hydride (0.83 mole). The ethyl heptafluorobutyrate was placed in a one-liter three-necked flask equipped with a reflux condenser, stirrer and dropping funnel modified for addition of dry nitrogen. The sodium hydride was added to the ester, and the ethyl acetate was then added dropwise to the stirred mixture. The addition took three hours and the mixture was maintained at approximately 60° C. for an additional five hours. The oil from the condensation was then refluxed overnight in 300 milliliters of 40 percent sulfuric acid. An oil was distilled from this sulfuric acid mixture, B.P. 55–95° C. which, on standing for one-half hour, separated into two layers. The water layer was removed and the crude product weighed 150 grams. This substance was refluxed with about 200 grams of phosphoric anhydride for three hours and then distilled through a 30-centimeter Vigreux column. There was thus obtained about 30 grams of 3,3,4,4,5,5,5-heptafluoro-2-pentanone, boiling at about 61–62° C. having a refractive index ($n_D^{20}$) of approximately 1.2900.

PREPARATION 4.—3,3,4,4,5,5,5-HEPTAFLUORO-1-NITRO-2-PENTANOL

One hundred and eleven grams (0.51) mole of heptafluorobutanal hydrate was stirred with 34 grams of nitromethane (0.57 mole) in the presence of 1.06 grams of anhydrous potassium carbonate. After heating the mixture at 50–60° C. for three hours, the potassium carbonate was washed out with water, the water extracted with ether and the ether-oil fractions combined and dried. Upon distillation through a modified Claisen head, 101 grams of the product was obtained, B.P. 58–52° C./1 mm. This material was then rectified to obtain a pure product. There was thus obtained approximately 75 percent of the theoretical yield of $C_3F_7CHOHCH_2NO_2$ in the form of a water-white liquid boiling at about 56° C./2 mm. having an index of refraction ($N_D^{20}$) of 1.3522.

Analysis.—Calculated for $C_3F_7CHOHCH_2NO_2$: C, 23.16%; H, 1.54%; N, 5.40%. Found: C, 23.29%; H, 1.54%; N, 5.43%.

PREPARATION 5.—4,4,5,5,6,6,6-HEPTAFLUORO-2-NITRO-3-HEXANOL

Using heptafluorobutanal hydrate and 1-nitroethane, and following the procedure of Preparation 4, there was obtained approximately 70 percent of the theoretical yield of $C_3F_7CHOHCH(CH_3)NO_2$ in the form of a water-white liquid boiling at about 55° C./1 mm. having a refractive index ($N_D^{20}$) of 1.3589.

*Analysis.*—Calculated for $C_3F_7CHOHCH(CH_3)NO_2$: C, 26.37%; H, 2.19%; N, 5.12%. Found: C, 26.22%; H, 2.36%; N, 5.18%.

PREPARATION 6.—3,3,3-TRIFLUORO-1-NITRO-2-PROPANOL

Using fluoral hydrate and nitromethane, and following the procedure of Preparation 4, there was obtained approximately 47 percent of the theoretical yield of $CF_3CHOHCH_2NO_2$ in the form of a water-white liquid boiling at about 84° C./17 mm. having a refractive index ($N_D^{20}$) of 1.3771.

*Analysis.*—Calculated for $CF_3CHOHCH_2NO_2$: C, 22.64%; H, 2.51%; N, 8.80%. Found: C, 22.63%; H, 2.62%; N, 8.85%.

PREPARATION 7.—5,5,6,6,7,7,7-HEPTAFLUORO-3-NITRO-4-HEPTANOL

Using heptafluorobutanal hydrate and 1-nitropropane, and following the procedure of Preparation 4, there was obtained approximately 78 percent of the theoretical yield of $C_3F_7CHOCH(C_2H_5)NO_2$ in the form of a water-white liquid boiling at about 73° C./5 mm. having a refractive index ($N_D^{20}$) of 1.3657.

*Analysis.*—Calculated for $C_3F_7CHOCH(C_2H_5)NO_2$: C, 29.26%; H, 1.79%; N, 4.87%. Found: C, 29.38%; H, 1.98%; N, 5.00%.

PREPARATION 8.—3,3,4,4,5,5,5-HEPTAFLUORO-2-METHYL-1-NITRO-2-PENTANOL

Twenty-one and two-tenths grams (0.1 mole) of 3,3,4,4,5,5,5-heptafluoro-2-pentanone was dissolved in 85 grams (1.4 moles) of nitromethane and refluxed through a Soxhlet extractor which contained 0.6 gram of anhydrous potassium carbonate. The refluxing was continued for seven hours with some polymerization noted in the flask. The reaction mixture was then washed with two 100-milliliter portions of water and the combined water washings extracted with ether twice. The ether extract and residual oil were combined and dried over Drierite. After removal of the ether, the excess nitromethane was removed by distillation through a 30-centimeter column filled with Heli-Pack. The remaining substance was distilled in a modified Claisen flask resulting in 7.6 grams, B.P. 33–41° C./1 mm. This substance was purified by rectification.

There was thus obtained approximately 28 percent of the theoretical yield of $C_3F_7C(CH_3)OHCH_2NO_2$ in the form of a water-white liquid boiling at about 68° C./8 mm. having an index of refraction ($N_D^{20}$) of 1.3624.

*Analysis.*—Calculated for $C_3F_7C(CH_3)OHCH_2NO_2$: C, 26.14%; H, 2.19%; N, 5.12%. Found: C, 26.43%; H, 2.32%; N, 5.21%.

*Example 1.—3,3,4,4,5,5,5-heptafluoro-1-nitro-1-pentene*

Forty-three grams of 3,3,4,4,5,5,5-heptafluoro-1-nitro-2-pentanol (0.166 mole) was mixed with 26 grams of phosphorus pentoxide in a flask equipped with a reflux condenser. The mixture was brought to gentle reflux for 1.5 to 2 hours during which time the olefin formed. After cooling the reaction mixture the excess phosphorus pentoxide was destroyed by adding water slowly. The olefin was extracted from the water with ether, dried over anhydrous magnesium sulfate and distilled through a heated 35-centimeter Vigreux column after removal of the ether. The olefin distilled at 117–119° C. and weighed 26.6 grams (68%). Purification of the substance was accomplished by rectification.

There was thus obtained approximately 68 percent of the theoretical yield of $C_3F_7CH=CHNO_2$ in the form of a water-white liquid boiling at about 122° C. having a refractive index ($N_D^{20}$) of 1.3403.

*Analysis.*—Calculated for $C_3F_7CH=CHNO_2$: C, 24.90%; H, 0.83%; N, 5.80%. Found: C, 25.14%; H, 0.97%; N, 5.78%.

*Example 2.—5,5,6,6,7,7,7-heptafluoro-3-nitro-3-heptene*

Fifty-six grams (0.195 mole) of 1,1,1,2,2,3,3-heptafluoro-5-nitro-4-heptanol was mixed with 9 drops of concentrated sulfuric acid, and 30.6 grams (0.3 mole) of acetic anhydride was added dropwise with stirring so the temperature of the mixture did not go above 90° C. The mixture was then heated at 80–90° C. for six hours, cooled and hydrolyzed in 600 milliliters of water for 30 minutes. The mixture of olefin and acetoxy derivative was extracted twice with 150-milliliter portions of ether and dried over anhydrous magnesium sulfate. After removal of the ether the product was treated with 21 grams of anhydrous sodium carbonate and heated gently for one to two hours. During this time a solid mass formed and care was taken not to use excessive heat. The formation of the olefin was noted by the formation of a yellow color. Upon cooling, the olefin was extracted from the solid residue with anhydrous ether (500–600 milliliters) and the ether removed from the olefin. The olefin was distilled through a 35-centimeter heated Vigreux column to give 40.8 grams of product, B.P. 70–71° C./51 mm. A purified sample was obtained by rectification.

There was thus obtained approximately 78 percent of the theoretical yield of $C_3F_7CH=C(C_2H_5)NO_2$ in the form of a water-white liquid boiling at about 78° C./75 mm. having a refractive index ($n_D^{20}$) of 1.3574.

*Analysis.*—Calculated for $C_3F_7CH=C(C_2H_5)NO_2$: C, 31.22%; H, 2.23%; N, 5.20%. Found: C, 31.24%; H, 2.33%; N, 5.32%.

*Example.—4,4,5,5,6,6,6-heptafluoro-2-nitro-2-hexene*

Forty grams (0.147 mole) of heptafluoro-2-nitro-3-hexanol was treated with 8 drops of concentrated sulfuric acid and added dropwise to 57 grams (0.252 mole) of melted benzoic anhydride. The mixture was then stirred at a temperature of 120–130° C. for one and one-half hours and then poured into water. The solid which formed was treated with sodium bicarbonate until slightly basic and the solution heated gently until all the solid dissolved and a yellow liquid remained insoluble in water. Extraction with water and distillation gave 19.3 grams (approximately 63% of the theoretical yield) of $C_3F_7CH=C(CH_3)NO_2$ boiling at 136° C. The residue left in the distillation pot was benzoic acid.

Among the other compounds of the present invention which can be prepared by the method of the preceding examples are:

$CF_3CH=CHNO_2$ $C_3F_7C(CH_3)=CHNO_2$ $CF_3CH=CNO_2CH_3$ $CF_3CH=CNO_2C_4H_9$ $CF_3C(iso-C_4H_9)=CHNO_2$ $C_2F_5C(C_5H_{11})=CNO_2C_2H_5$ $C_2F_5CH=CNO_2C_6H_{13}$ $C_4F_9CH=NO_2(neo-C_5H_{11})$ $(isi-C_5F_{11})CH=HNO_2$ $C_5H_{11}C(CH_3)=CNO_2C_2H_5$ $(neo-C_5F_{11})CH=CNO_2C_7H_{15}$ $C_8F_{17}CH=CHNO_2$ $C_8F_{17}C(C_5H_{11})=CHNO_2$ The fluorinated nitro-olefins of the present invention may be reduced to the corresponding fluoro-nitro alkanes.

REACTION 1.—1,1,1,2,2,3,3-HEPTAFLUORO-5-NITROPENTANE

Thirty-five grams (0.145 mole) of 3,3,4,4,5,5,5-heptafluoro-1-nitro-1-pentene was dissolved in 200 milliliters of anhydrous ether and cooled to —50° C. To this cooled solution 1.75 grams of lithium aluminum hydride dissolved in 100 milliliters of anhydrous ether was added dropwise. The time of addition was 1.5 hours and the temperature was maintained below —50° C. The reaction mixture was then allowed to come to room temperature and hydrolyzed with 20 milliliters of concentrated hydrochloric acid in 150 milliliters of water. The green ether solution which resulted was washed twice with water and dried with anhydrous magnesium sulfate. After removal of the ether the residue was distilled through a 30-centimeter Vigreux column. A fraction, B.P. 91-99° C./100–102 mm., which weighed 17.9 grams was recovered and was purified by rectification.

There was thus obtained approximately 50 percent of the theoretical yield of $C_3F_7CH_2CH_2NO_2$ in the form of a liquid boiling at 68° C./33 mm. having a refractive index ($n_D^{20}$) of 1.3335.

*Analysis.*—Calculated for $C_3F_7CH_2CH_2NO_2$: C, 24.69%; H, 1.64%; N, 5.76%. Found: C, 25.02%; H, 2.06%; N, 5.78%.

REACTION 2.—1,1,1,2,2,3,3-HEPTAFLUORO-5-NITROHEXANE

Following the procedure of Reaction 1, but utilizing 4,4,5,5,6,6,6 - heptafluoro - 2 - nitro - 2 - hexene there was obtained approximately 50 percent of the theoretical yield of $C_3F_7CH_2CH(CH_3)NO_2$ in the form of a liquid boiling at 64° C./23 mm. having a refractive index ($n_D^{20}$) of 1.3412.

*Analysis.*—Calculated for $C_3F_7CH_2CH(CH_3)NO_2$: C, 28.00%; H, 2.32%; N, 5.44%. Found: C, 28.49%; H, 2.46%; N, 5.55%.

REACTION 3.—1,1,1,2,2,3,3-HEPTAFLUORO-5-NITROHEPTANE

Following the procedure of Reaction 1, but utilizing 5,5,6,6,7,7,7-heptafluoro-3-nitro-3-heptene, there was obtained approximately 69 percent of the theoretical yield of $C_3F_7CH_2CH(C_2H_5)NO_2$ in the form of a liquid boiling at 60° C./9 mm. having a refractive index ($n_D^{20}$) of 1.3493.

*Analysis.*—Calculated for $C_3F_7CH_2CH(C_2H_5)NO_2$: C, 31.00%; H, 2.95%; N, 5.17%. Found: C, 31.21%; H, 2.84%; N, 5.19%.

The fluorinated nitro-olefins of the present invention also form fluorinated nitroalkanes by the addition of Grignard reagents.

REACTION 4.—1,1,1,2,2,3,3-HEPTAFLUORO-4-NITROMETHYLHEXANE

The Grignard reagent was prepared from 40 grams of ethyl bromide and 10.5 grams of magnesium in 150 milliliters of anhydrous ether. Fifty-nine grams (0.245 mole) of 3,3,4,4,5,5,5-heptafluoro-1-nitro-1-pentene was dissolved in 200 milliliters of anhydrous ether and cooled in an ice-bath to 0–10° C. The Grignard reagent was added dropwise over a two-hour period to maintain a temperature below 10° C. The mixture was then heated to reflux for one hour and allowed to come to room temperature. Upon cooling in ice and neutralizing with a solution of 19.6 milliliters of acetic acid in 160 milliliters of water the ether was separated from the water and the water layer extracted once with ether. The two ether fractions were combined and washed with sodium carbonate solution and once with water. After drying over magnesium sulfate and removal of the ether, 34.8 grams of an oil, B.P. 52-58° C./9–10 mm., was obtained by distillation through a modified Claisen head and was rectified for further purification.

There was thus obtained approximately 53 percent of the theoretical yield of $C_3F_7CH(C_2H_5)CH_2NO_2$ in the form of a liquid boiling at 56° C./18 mm. having a refractive index ($n_D^{20}$) of 1.3543.

*Analysis.*—Calculated for $C_3F_7CH(C_2H_5)CH_2NO_2$: C, 31.00%; H, 2.95%; N, 5.17%. Found: C, 30.95%; H, 3.01%; N, 5.19%.

REACTION 5.—1,1,1,2,2,3,3-HEPTOFLUORO-4-NITROMETHYLPENTANE

Following the procedure of Reaction 4, but utilizing methyl bromide in place of ethyl bromide, there was obtained approximately 38 percent of the theoretical yield of $C_3F_7CH(CH_3)CH_2NO_2$ in the form of a liquid boiling at 53° C./15 mm. having a refractive index ($n_D^{20}$) of 1.3447.

*Analysis.*—Calculated for $C_3F_7CH(CH_3)CH_2NO_2$: C, 28.00%; H, 2.32%; N, 5.44%. Found: C, 28.08%; H, 2.38%; N, 5.32%.

REACTION 6.—1,1,1,2,2,3,3,7,7,8,8,9,9,9-TETRADECAFLUORO-4-NITROMETHYL NONANE

Following the procedure of Reaction 5, but adding 3,3,4,4,5,5,5-heptafluoropentyl-magnesium bromide to the 3,3,4,4,5,5,5-heptafluoro-1-nitro-1-pentene and the methylmagnesium bromide, there was obtained approximately 23 percent of the theoretical yield of $$C_3F_7CH(CH_2CH_2C_3F_7)CH_2NO_2$$

in the form of a liquid boiling at 80° C./3 mm. having a refractive index ($n_D^{20}$) of 1.3361.

*Analysis.*—Calculated for $$C_3F_7CH(CH_2CH_2C_3F_7)CH_2NO_2$$

C, 27.30%; H, 1.57%; N, 3.19%. Found: C, 27.30%; H, 1.77%; N, 3.25%.

There was also obtained a lower boiling fraction, boiling at 57–58° C./12 mm. having a refractive index ($n_D^{20}$) of 1.3108 which was the coupled product 1,1,1,2,2,3,3,8,8,9,9,10,10,10-tetradecafluorodecane.

*Analysis.*—Calculated for $C_{10}H_8F_{14}$: C, 30.45%; H, 2.03%. Found: C, 30.23%; H, 2.27%.

The fluorinated nitro-olefins of the present invention form fluorinated di-nitro-alkanes by the addition of a metallic alkoxide salt.

REACTION 7.—1,3-DINITRO-2-PERFLUOROPROPYLPROPANE

A solution of sodium methoxide was prepared by dissolving 3.2 grams (0.14 mole) of sodium in 95 milliliters of absolute methanol. The solution was cooled to 10–15° C. and 10.2 grams (0.167 mole) of nitromethane added. Twenty-seven and one-half grams (0.113 mole) of 3,3,4,4,5,5,5-heptafluoro-1-nitro-1-pentene was added to the stirred solution dropwise at such a rate the temperature was maintained at 10–15° C. A yellow solid formed which slowly turned brown. After the addition of the olefin, the mixture was brought to room temperature and allowed to stir for 2.5 hours. The reaction mass was then poured into 500 milliliters of water and made just acidic with 2 N hydrochloric acid. A dark brown solid formed which was collected by filtration. The weight of this crude material was 23.3 grams (68%). When this product was recrystallized from 150 milliliters of petroleum ether-benzene (2:1) 11.4 grams of a product with a melting point of 59–60° C. was obtained. A recrystallization of one gram of this substance in a solution of 10 milliliters of petroleum ether (90–100° C.) and 3 milliliters of benzene gave cream colored, mica crystals which melted at 62–62.5° C.

*Analysis.*— Calculated for $C_3F_7CH(CH_2NO_2)_2$: C, 23.84%; H, 1.65%; N, 9.26%. Found: C, 23.94%; H, 1.86%; N, 9.47%.

The fluorinated nitro-olefins of the present invention form other Michael addition products as follows:

REACTION 8.—DIETHYL (2,2,3,3,4,4,4-HEPTAFLUORO-1-NITROMETHYYLBUTYL)MALONATE

Sodium ethoxide was prepared by dissolving 2.9 grams (0.126 mole) of sodium in 100 milliliters of absolute ethanol. This solution was cooled to 10–15° C. and 23.5 grams (0.15 mole) of diethyl malonate added. Over a period of 1.5 hours, 25 grams (0.102 mole) of 3,3,4,4,5,5,5-heptafluoro-1-nitro-1-pentene was added to the cooled mixture at such a rate the temperature did not go above 15° C. At the end of this time the solution was allowed to come to room temperature and stirred for another 1.5 hours. The alcoholic solution was then poured into 600 milliliters of water resulting in a yellow suspension which on acidification with concentrated hydrochloric acid gave a clear oil. The oil was extracted with ether, dried over anhydrous magnesium sulfate and distilled through a modified Claisen head after removal of the ether. A forerun up to 100° C./3 mm. weighed 12.5 grams while 20.0 grams (49%) of the product was recovered which distilled at 112–115° C./3 mm.

A rectification of the forerun gave another two grams of product for a total yield of 54 percent. When the product was redistilled through a 30-centimeter heated Vigreux column the compound distilled at 144–145° C./8–9 mm. and had a refractive index ($n_D^{20}$) of 1.3904.

Analysis.—Calculated for $C_3F_7CH[CH(CO_2C_2H_5)_2]CH_2NO_2$

C, 35.91%; H, 3.49%; N, 3.49%. Found: C, 36.11%; H, 3.51%; N, 3.68%.

REACTION 9.—1,1,1,2,2,3,3-HEPTAFLUORO-4-ETHOXY-5-NITROPENTANE

Ten grams (0.04 mole) of 3,3,4,4,5,5,5-heptafluoro-1-nitro-1-pentene was dissolved in 50 milliliters of absolute ethanol and refluxed for 48 hours. The liquid was rectified through a Todd Monel metal spiral column to separate the low boiling fraction. The remaining oil was transferred to a small flask equipped with a modified Claisen head and distilled under reduced pressure. Four grams of a product was obtained, B.P. 90° C./58 mm. This sample was purified by rectification.

There was thus obtained approximately 35 percent of the theoretical yield of $C_3F_7CH(OC_2H_5)CH_2NO_2$ in the form of a liquid boiling at 76° C./29 mm. having a refractive index ($n_D^{20}$) of 1.3488.

Analysis.—Calculated for $C_3F_7CH(OC_2H_5)CH_2NO_2$: C, 29.26%; H, 2.78%; N, 4.87%. Found: C, 29.51%; H, 3.18%; N, 4.96%.

REACTION 10.—1,1,1,2,2,3,3-HEPTAFLUORO-4-p-CARBOXYANILINO-5-NITROPENTANE

Five grams (0.021 mole) of 3,3,4,4,5,5,5-heptafluoro-1-nitro-1-pentene was treated with 3 grams (0.022 mole) of p-aminobenzoic acid in a solution of 25 milliliters of absolute ethanol. The solution was refluxed for 45 minutes and allowed to stand overnight. With the addition of 10 milliliters of water and cooling in ice, 2.1 grams of a white crystalline product formed. A second crop weighed 2.7 grams. A sample of this product when recrystallized had a melting point of 125.5–126.5° C.

Analysis.—Calculated for $C_3F_7CH(NHC_6H_4COOH)CH_2NO_2$

C, 38.09%; H, 2.37%; N, 7.40%. Found: C, 38.31%; H, 2.59%; N, 7.22%.

1,1,1,2,2,3,3 - heptafluoro - 4 - p - carboxyanilino - 5 - methyl-5-nitropentane was prepared in a manner analogous to the above reaction. The white crystalline product melted at 149–150° C.

The fluoro-nitro olefins of the present invention may be reduced to the fluoroamino alkane.

REACTION 11.—1-AMINO-1-ETHYL-3,3,4,4,5,5,5-HEPTAFLUOROPENTANE

Twelve and one-half grams of 5,5,6,6,7,7,7-heptafluoro-3-nitro-3-heptene (0.046 mole) was dissolved in 180 milliliters of absolute ethyl ether and added dropwise to a stirred suspension of 3.8 grams of lithium aluminum hydride (0.1 mole) in 150 milliliters of absolute ether at such a rate that gentle reflux was maintained. At the end of this time the excess lithium aluminum hydride was hydrolyzed with about 20 milliliters of 95 percent ethanol, and 250 milliliters of a 20 percent sodium potassium tartrate solution was added to the mixture. The ether layer was separated from the mixture and the water layer was extracted twice with 150-milliliter portions of ether. The ether layers were combined and dried over anhydrous magnesium sulfate. The ether was removed through a 30-centimeter Vigreux column and the residue distilled through a heated Vigreux column at 60° C./82 mm. The product had a refractive index ($n_D^{20}$) of 1.3388. The yield was 5.5 gram (50%). The product was purified by rectification.

Analysis.—Calculated for $C_3F_7CH_2CH(C_2H_5)NH_2$: C, 34.85%; H, 4.14%; N, 5.81%. Found: C, 35.03%; H, 4.46%; N. 5.60%.

The hydrochloride of this compound was prepared and found to melt at 236–238° C.

Analysis.—Calculated for $C_7H_{11}NClF_7$: C, 30.32%; H, 3.97%; N, 5.05%. Found: C, 30.02%; H, 4.18%; N, 5.05%.

The benzamide of this compound was found to melt at 43–45° C.

Analysis.—Calculated for $C_{14}H_{14}ONF_7$: C, 48.69%; H, 4.05%; N, 4.05%. Found: C, 48.71%; H, 3.98%; N, 3.90%.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A 1-lower-perfluoroalkyl-2-nitro-1-alkene.
2. 3,3,4,4,5,5,5-heptafluoro-1-nitro-1-pentene.
3. 5,5,6,6,7,7,7-heptafluoro-3-nitro-3-heptene.
4. 4,4,5,5,6,6,6-heptafluoro-2-nitro-2-hexene.
5. 3,3,3-trifluoro-1-nitro-1-propene.
6. 3,3,4,4,4-heptafluoro-2-methyl-1-nitro-1-pentene.

No references cited.